Aug. 27, 1935. M. REICH 2,012,480
MEASUREMENT OF THE PHASE DISPLACEMENT OF
ALTERNATING CURRENTS OR VOLTAGES
Filed May 16, 1934
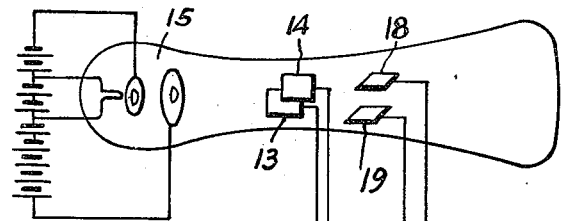
FIG. 1.
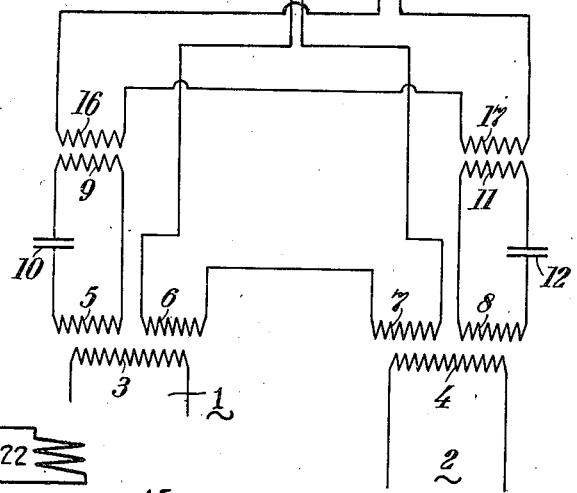
FIG. 2.
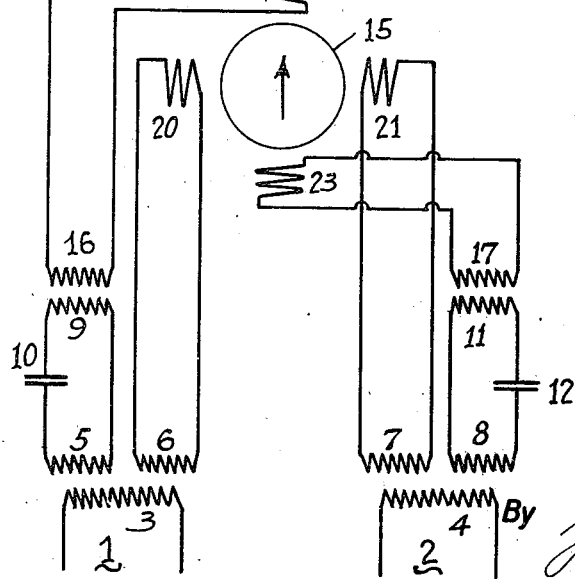
Max Reich *Inventor*
By Maurice Appleman *Attorney*

Patented Aug. 27, 1935

2,012,480

UNITED STATES PATENT OFFICE 2,012,480

MEASUREMENT OF THE PHASE DISPLACEMENT OF ALTERNATING CURRENTS OR VOLTAGES

Max Reich, Gottingen, Germany

Application May 16, 1934, Serial No. 725,976
In Germany May 17, 1933

14 Claims. (Cl. 172—245)

The present invention relates to a method of and means for measuring the phase displacement of alternating currents, particularly of high frequency alternating currents.

It is well known that a rotating magnetic field can be produced by two alternating currents of the same frequency, if they have a phase difference of 90°, by allowing the magnetic components of the alternating currents to act in two directions perpendicular to one another. This phenomenon has already been used for the measurement of the phase displacement of alternating currents by employing the rotating fields to drive synchronously movable members, for instance synchronous motors, from the lead or lag of which the angle of the phase displacement has then been determined.

The present invention has for its object the measurement of the phase displacement of alternating currents, particularly those of high frequency, by avoiding the synchronously driven movable members above referred to and producing the two rotating fields in a single stationary system.

A further object of the invention is to provide a single stationary system as above described which allows of directly measuring or indicating the phase angle of the alternating currents.

Yet another object of the invention is to accomplish the foregoing objects by obtaining the measurement of the phase displacement of two alternating currents by producing the two rotating fields in a single stationary system formed by the pairs of plates of a Braun tube.

The above objects and advantages of the invention will be more clearly understood from the following description, given by way of example with reference to the accompaying drawing, of a preferred embodiment utilizing a Braun tube for giving an indication of the phase displacement.

By way of explanation, it will be understood that if the voltages of two alternating currents of the same frequency, but having a phase difference of 90°, are applied to two pairs of plates of a Braun tube, the paths between which are at right angles to one another, a rotating electric field will be formed, which compels the electron stream of the Braun tube to describe a circular path. If, in the first instance, only one alternating current is available, a second alternating current displaced in phase by 90° can readily be produced according to well known methods, such as by energizing inductively by the first alternating current an oscillatory circuit tuned to the same frequency.

If two such arrangements, having alternating currents of the same frequency, are allowed to act on the electron stream of the same Braun tube, in such a manner as to produce therein two circular paths of the electron stream having opposite directions of rotation, the light spot of the Braun tube will then move in a straight line if the currents in both circuits are of equal magnitude.

If one alternating current under measurement has lagged somewhat with respect to the other, that is if it has a phase difference with respect to the first, the direction of the straight line will vary accordingly. The angle which the normal direction and the new direction form with one another is the angle which the phases of the two alternating currents make with respect to one another. A direct measurement or indication of the phase angle can thus be obtained.

If a Braun tube with four pairs of plates be used, the four alternating currents, that is the two alternating currents under measurement and the two auxiliary alternating currents, may each be connected to a pair of plates. However, a Braun tube with only two pairs of plates may also be employed, the electric potentials of the two arrangements then being combined and applied in a suitable manner to the plates of the tube.

In the accompanying drawing, like characters of reference indicate like parts in the several views, and Fig. 1 is a diagrammatic view showing one embodiment of the invention.

Fig. 2 is a similar view showing a second embodiment of the invention.

In the drawing, the two alternating current circuits, the phase displacement of the currents of which is to be measured, are represented by 1 and 2. The primary windings 3 and 4 act on two secondary windings, 5, 6 and 7, 8 respectively. The secondary winding 5 forms, together with the winding 9 and the tuning condenser 10, an auxiliary circuit for producing one auxiliary phase. The secondary winding 8 forms, together with the winding 11 and tuning condenser 12, an auxiliary circuit for producing a second auxiliary phase. The secondary windings 6 and 7 are connected at one of their ends to the plates 13 and 14 of a Braun tube 15, while the other ends are connected together in the manner illustrated. The windings 9 and 11 transmit the auxiliary alternating currents produced in them to the secondary windings 16 and 17, which are connected together at one end and to the second pair of plates 18 and 19 of the Braun tube at their other ends. The pair of plates 18, 19 of the Braun tube is arranged so that the path therebetween is at right angles to the path between the first pair of plates.

For the purpose of explanation, let it be assumed in the first instance that there is no current in the circuit 2 and primary winding 4. The pair of plates 13, 14 then receives an alternating voltage through the secondary winding 6 from the alternating current circuit 1, and the pair of plates 18, 19 receives an alternating voltage displaced in phase by 90° through the auxiliary circuit 5, 9 and 10 and the secondary winding 16. Consequently, the light spot of the Braun tube 15, the position of which spot is influenced by the voltages on the pairs of plates, describes a circle in well known manner. A similar explanation applies when the circuit 2 is carrying current, while circuit 1 is devoid of current. By giving suitable polarity, the result may readily be obtained that the directions of rotation of the circular movements are opposite, so that if both circuits are carrying current of the same phase, a linear field is produced and the two light-spot circles combine to form a straight line.

Instead of the electrical deflection of the electron stream of the pairs of plates, magnetic effects of coils can also be used. Furthermore, if desired, one circle may be produced by electrical effects on the electron stream and the other circle by means of magnetic effects.

The Braun tube may further be provided, if desired, with a normal line corresponding to phase equality of the alternating currents, so that any deviation of the straight light-spot line which is caused by phase difference of the two alternating currents directly indicates the phase angle. Since the electron stream of the Braun tube operates substantially without inertia, phase displacements of alternating currents of any high frequencies can readily be measured. Such a device is shown in Fig. 2 wherein the Braun tube 15 is surrounded by four windings arranged in opposed pairs, the windings 20 and 21 forming one pair and the windings 22 and 23 forming the other pair. The windings 20 and 21 are connected respectively in series with the secondaries 6 and 7 and the windings 22 and 23 are connected respectively in series with the secondaries 5 and 8.

It will be understood, however, that although the invention is particularly applicable to the measurement of the phase displacement of high frequency alternating currents, it is in no way limited to such application.

Furthermore, although a particular embodiment of the invention has been described by way of example, many modifications thereof will be apparent to those skilled in the art and the scope of the invention is only limited by the scope of the appended claims.

I claim:—

1. In apparatus for indicating the phase displacement of two alternating current quantities, means for producing in a stationary system rotating fields of force corresponding to said alternating current quantities and having opposite directions of rotation, and stationary means for combining said rotating fields of force into a linear field the direction of which is variable in accordance with the phase displacement of said alternating current quantities.

2. In apparatus for indicating the phase displacement of two alternating current quantities, means for producing in a stationary system rotating fields of force corresponding to said alternating current quantities, having opposite directions of rotation, and stationary means for combining said rotating fields of force into a linear field, the angle of the direction of which, with a normal direction, is a measurement of the phase displacement of said alternating current quantities.

3. In apparatus for indicating the phase displacement of two alternating current quantities, means for producing in a stationary system rotating magnetic fields corresponding to said alternating current quantities, said fields having opposite directions of rotation, and stationary means for combining said rotating magnetic fields into a linear field the direction of which is variable in accordance with the phase displacement of said alternating current quantities.

4. In apparatus for indicating the phase displacement of two alternating current quantities, a stationary system including stationary condenser plates, means for producing therein rotating electric fields corresponding to said alternating current quantities, said fields having opposite directions of rotation, stationary means for combining said rotating fields into a linear field the direction of which is variable in accordance with the phase displacement of said alternating current quantities, and indicating means controlled directly by said variable linear field for giving an indication of said phase displacement.

5. In apparatus for indicating the phase displacement of two alternating current quantities, a stationary system including stationary magnetic coils, means for producing therein rotating magnetic fields corresponding to said alternating current quantities, said fields having opposite directions of rotation, stationary means for combining said rotating fields into a linear field the direction of which is variable in accordance with the phase displacement of said alternating current quantities, and indicating means controlled directly by said variable linear field for giving an indication of said phase displacement.

6. In apparatus for indicating the phase displacement of two alternating current quantities, stationary means for producing auxiliary individual alternating current quantities displaced in phase by 90° with respect to each alternating current quantity under measurement, to produce thereby rotating fields of force having opposite directions of rotation, and stationary means for combining said rotating fields of force into a linear field the direction of which is variable in accordance with the phase displacement of said alternating current quantities.

7. In apparatus for indicating the phase displacement of two alternating current quantities, stationary means for producing auxiliary individual alternating current quantities displaced in phase by 90° with respect to each alternating current quantity under measurement, a system of stationary condenser plates, stationary means for applying said alternating current quantities to said system of stationary condenser plates, to produce therein rotating electric fields having opposite directions of rotation, stationary means for combining said rotating fields into a linear field the direction of which is variable in accordance with the phase displacement of said alternating current quantities, and indicating means controlled by said variable linear field for giving an indication of said phase displacement.

8. In apparatus for indicating the phase displacement of two alternating current quantities, stationary means for producing auxiliary individual alternating current quantities displaced in phase by 90° with respect to each alternating current quantity under measurement, a system of stationary magnetic coils, stationary means for applying said alternating current quantities to said system of magnetic coils, to produce therein rotating magnetic fields having opposite directions of rotation, stationary means for combining said rotating fields into a linear field the direction of which is variable in accordance with the phase displacement of said alternating current quantities, and indicating means controlled by said variable linear field for giving an indication of said phase displacement.

9. In apparatus for indicating the phase displacement of two alternating current quantities, stationary means for producing rotating fields of force corresponding to said alternating current quantities and having opposite directions of rotation, stationary means for combining said rotating fields of force into a linear field the direction of which is variable in accordance with the phase displacement of said alternating current quantities, a cathode ray tube, and stationary means for controlling the electron stream of said cathode ray tube by said linear field, so that the light-spot line of said tube indicates the phase angle between said alternating current quantities.

10. In apparatus for indicating the phase displacement of two alternating current quantities, stationary means for producing auxiliary individual alternating current quantities displaced in phase by 90° with respect to each alternating current quantity under measurement, to produce thereby rotating field components having opposite directions of rotation, a cathode ray tube, and stationary means whereby said rotating fields act in opposite directions on the electron stream of said tube to produce a resultant linear field, so that the light-spot line of said tube indicates the phase angle between the alternating current quantities under measurement.

11. In apparatus for indicating the phase displacement of two alternating current quantities, stationary means for producing auxiliary individual alternating current quantities displaced in phase by 90° with respect to each alternating current quantity under measurement, a cathode ray tube including deflecting means, and stationary means for applying the several alternating current quantities to the deflecting means of said cathode ray tube, to produce rotating fields acting in opposite directions on the electron stream of said cathode ray tube whereby to produce a resultant linear field, and stationary means whereby the light-spot line of said tube directly indicates the phase angle of said alternating current quantities under measurement.

12. The method of indicating the phase displacement between two alternating current quantities, which comprises producing in a stationary system rotating fields corresponding to said quantities and having opposite directions of rotations, combining said rotating fields into a single linear field the direction of which is variable in accordance with the phase displacement of said alternating current quantities, and controlling indicating means with said variable linear field.

13. The method of indicating the phase displacement between two alternating current quantities, which comprises producing in a stationary system auxiliary individual alternating current quantities displaced in phase by 90° relatively to each of said alternating current quantities under measurement, to produce rotating fields having opposite directions of rotation, combining said rotating fields into a single linear field the direction of which is variable in accordance with the phase displacement of said alternating current quantities, and controlling indicating means with said variable linear field.

14. The method of indicating the phase displacement between two alternating current quantities, which comprises producing in a stationary system auxiliary individual alternating current quantities displaced in phase by 90° relatively to each of said alternating current quantities under measurement, to produce rotating fields having opposite directions of rotation, combining said rotating fields into a single linear field the direction of which is variable in accordance with the phase displacement of said alternating current quantities under measurement, and applying said linear field to the control of the electron stream of a cathode ray tube, so that the light-spot line of said tube gives a direct indication of the phase displacement of said alternating current quantities under measurement.

MAX REICH.